(12) United States Patent
Biedermann et al.

(10) Patent No.: US 8,909,550 B2
(45) Date of Patent: Dec. 9, 2014

(54) RELATIONSHIP-BASED PRICING

(75) Inventors: Richard H. Biedermann, Wilmington, DE (US); Gail C. Kilmer, Mullica Hill, NJ (US); William F. Oldham, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 236 days.

(21) Appl. No.: 13/209,574

(22) Filed: Aug. 15, 2011
(Under 37 CFR 1.47)

(65) Prior Publication Data
US 2013/0046666 A1   Feb. 21, 2013

(51) Int. Cl.
*G06Q 40/00* (2012.01)
*G06Q 40/04* (2012.01)
*G06Q 40/06* (2012.01)

(52) U.S. Cl.
CPC ............... *G06Q 40/04* (2013.01); *G06Q 40/00* (2013.01); *G06Q 40/06* (2013.01)
USPC ........................ 705/35; 705/14.13; 705/14.27

(58) Field of Classification Search
None
See application file for complete search history.

(56) References Cited

U.S. PATENT DOCUMENTS

| | | | | |
|---|---|---|---|---|
| 6,327,574 B1 * | 12/2001 | Kramer et al. | ............. | 705/14.66 |
| 6,424,951 B1 * | 7/2002 | Shurling et al. | ............ | 705/14.27 |
| 6,947,897 B2 * | 9/2005 | Lortscher et al. | ........... | 705/14.36 |
| 7,092,905 B2 * | 8/2006 | Behrenbrinker et al. | ....... | 705/39 |
| 7,204,412 B2 * | 4/2007 | Foss, Jr. | ..................... | 235/380 |
| 7,360,693 B1 * | 4/2008 | Sullivan | .................... | 235/380 |
| 7,814,019 B2 * | 10/2010 | Knapp | ........................ | 705/45 |
| 7,827,064 B1 | 11/2010 | Foster | | |
| 7,831,467 B1 * | 11/2010 | Lefebvre et al. | ............. | 705/14.1 |
| 7,899,732 B2 * | 3/2011 | Van Beaumont et al. | ....... | 705/37 |
| 8,055,548 B2 * | 11/2011 | Staib et al. | ................... | 705/26.1 |
| 8,060,463 B1 * | 11/2011 | Spiegel | ........................ | 707/609 |
| 8,074,876 B2 * | 12/2011 | Foss et al. | .................... | 235/380 |
| 8,078,528 B1 * | 12/2011 | Vicente et al. | .................. | 705/38 |
| 8,190,522 B1 * | 5/2012 | Vicente et al. | .................. | 705/40 |
| 8,386,351 B2 * | 2/2013 | Karlsson | ........................ | 705/35 |
| 2001/0014868 A1 * | 8/2001 | Herz et al. | ..................... | 705/14 |
| 2002/0010625 A1 * | 1/2002 | Smith et al. | .................... | 705/14 |
| 2002/0161561 A1 * | 10/2002 | Sarma et al. | ........................ | 703/2 |
| 2002/0198882 A1 * | 12/2002 | Linden et al. | ................... | 707/10 |
| 2003/0097296 A1 * | 5/2003 | Putt | ................................ | 705/11 |
| 2003/0233278 A1 * | 12/2003 | Marshall | ........................ | 705/14 |
| 2004/0073511 A1 * | 4/2004 | Beaumont et al. | .............. | 705/42 |
| 2004/0193537 A1 * | 9/2004 | Knapp | .......................... | 705/39 |
| 2005/0044034 A1 * | 2/2005 | Perry et al. | ..................... | 705/37 |

(Continued)

OTHER PUBLICATIONS

"Relationship-based Pricing (RBP)," SunTec Business Solutions Pvt. Ltd., retrieved from the World Wide Web on Jul. 7, 2011, Princeton, New Jersey.

(Continued)

*Primary Examiner* — Gregory Johnson
(74) *Attorney, Agent, or Firm* — Weiss & Arons LLP; Michael A. Springs, Esq.

(57) ABSTRACT

Customers may utilize different services or products of a provider. The different services or products utilized by a customer may create different relationships between the provider and the customer. Systems and methods are provided for coordinating the different relationships to provide relationship-based pricing. Relationship-based pricing may increase customer satisfaction with services or products offered by the provider. Systems and methods may adjust fees associated with services or products of the provider by coordinating the different relationships. The fees may be decreased or waived to increase customer satisfaction.

25 Claims, 4 Drawing Sheets

(56) References Cited

U.S. PATENT DOCUMENTS

| | | | |
|---|---|---|---|
| 2005/0102202 A1* | 5/2005 | Linden et al. | 705/27 |
| 2006/0031107 A1* | 2/2006 | Aihara et al. | 705/7 |
| 2006/0163347 A1* | 7/2006 | Foss et al. | 235/380 |
| 2006/0173739 A1* | 8/2006 | Heywood | 705/14 |
| 2006/0259364 A1* | 11/2006 | Strock et al. | 705/14 |
| 2006/0289621 A1* | 12/2006 | Foss et al. | 235/375 |
| 2007/0043657 A1* | 2/2007 | Koenigsman et al. | 705/38 |
| 2007/0043665 A1* | 2/2007 | Jemella et al. | 705/40 |
| 2007/0208640 A1* | 9/2007 | Banasiak et al. | 705/35 |
| 2007/0244741 A1* | 10/2007 | Blume et al. | 705/10 |
| 2007/0294670 A1* | 12/2007 | Hisaki | 717/120 |
| 2008/0082407 A1* | 4/2008 | Georgiadis et al. | 705/14 |
| 2008/0103967 A1* | 5/2008 | Ackert et al. | 705/39 |
| 2008/0167928 A1 | 7/2008 | Cao et al. | |
| 2008/0208677 A1* | 8/2008 | Mayr et al. | 705/10 |
| 2008/0215427 A1* | 9/2008 | Kawada et al. | 705/14 |
| 2008/0222037 A1* | 9/2008 | Foss et al. | 705/41 |
| 2008/0235130 A1 | 9/2008 | Malov et al. | |
| 2008/0270248 A1* | 10/2008 | Brill | 705/26 |
| 2009/0037323 A1* | 2/2009 | Feinstein et al. | 705/38 |
| 2009/0063261 A1* | 3/2009 | Scribner et al. | 705/14 |
| 2009/0157517 A1* | 6/2009 | Davis | 705/17 |
| 2009/0265216 A1* | 10/2009 | Flynn et al. | 705/10 |
| 2009/0271305 A1* | 10/2009 | Lal et al. | 705/35 |
| 2009/0271327 A1* | 10/2009 | Lal et al. | 705/36 R |
| 2010/0049538 A1* | 2/2010 | Frazer et al. | 705/1 |
| 2010/0057613 A1* | 3/2010 | Isralow | 705/41 |
| 2010/0063903 A1* | 3/2010 | Whipple et al. | 705/30 |
| 2010/0076873 A1* | 3/2010 | Taylor et al. | 705/30 |
| 2010/0106584 A1* | 4/2010 | Etheredge et al. | 705/14.17 |
| 2011/0178900 A1* | 7/2011 | Imrev et al. | 705/30 |
| 2011/0288918 A1* | 11/2011 | Cervenka et al. | 705/14.17 |
| 2012/0054095 A1* | 3/2012 | Lesandro et al. | 705/39 |
| 2012/0078766 A1* | 3/2012 | Rose et al. | 705/35 |
| 2012/0078813 A1* | 3/2012 | Rose et al. | 705/36 R |
| 2012/0166264 A1* | 6/2012 | Shum et al. | 705/14.17 |
| 2012/0303412 A1* | 11/2012 | Etzioni et al. | 705/7.31 |
| 2013/0046666 A1* | 2/2013 | Biedermann et al. | 705/35 |
| 2013/0246217 A1* | 9/2013 | Denton et al. | 705/26.7 |

OTHER PUBLICATIONS

"First Credit Union Relationship Pricing Program," First Credit Union, retrieved from the World Wide Web on Jul. 7, 2011, Powell River, BC.

"Nomis Solutions Pricing and Profitability Management for Financial Services—How It Works," Nomis Solutions, Inc., retrieved from the World Wide Web on Jul. 7, 2011, San Bruno, California.

* cited by examiner

RELATIONSHIP-BASED PRICING

FIELD OF TECHNOLOGY

Aspects of the invention relate to providing apparatus and methods for relationship-based pricing.

BACKGROUND

A bank, financial institution and/or other provider (collectively hereinafter, "provider") may offer various services or products to the public. Customers of the provider may utilize one or more of the services or products offered by the provider.

Because services or products of the provider may differ in character, a service or product of the provider may be administered by a sub-unit of the provider. A sub-unit may unaware of customer interactions and/or customer behavior relating to a service or product administered by a different sub-unit.

A customer utilizing a service or product of the provider may be encouraged to utilize additional services or products if the provider can demonstrate an understanding of an overall relationship that exists between the customer and the provider.

A provider that offers relationship-based pricing to a customer may demonstrate that the provider understands an overall relationship that exists between the customer and the provider.

It would be desirable, therefore, to provide apparatus and methods for relationship-based pricing.

SUMMARY

Systems and methods are provided for relationship-based pricing. Relationship-based pricing may allow a provider to offer a customer services, products and/or pricing based on strength of an overall relationship between the customer and the provider.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
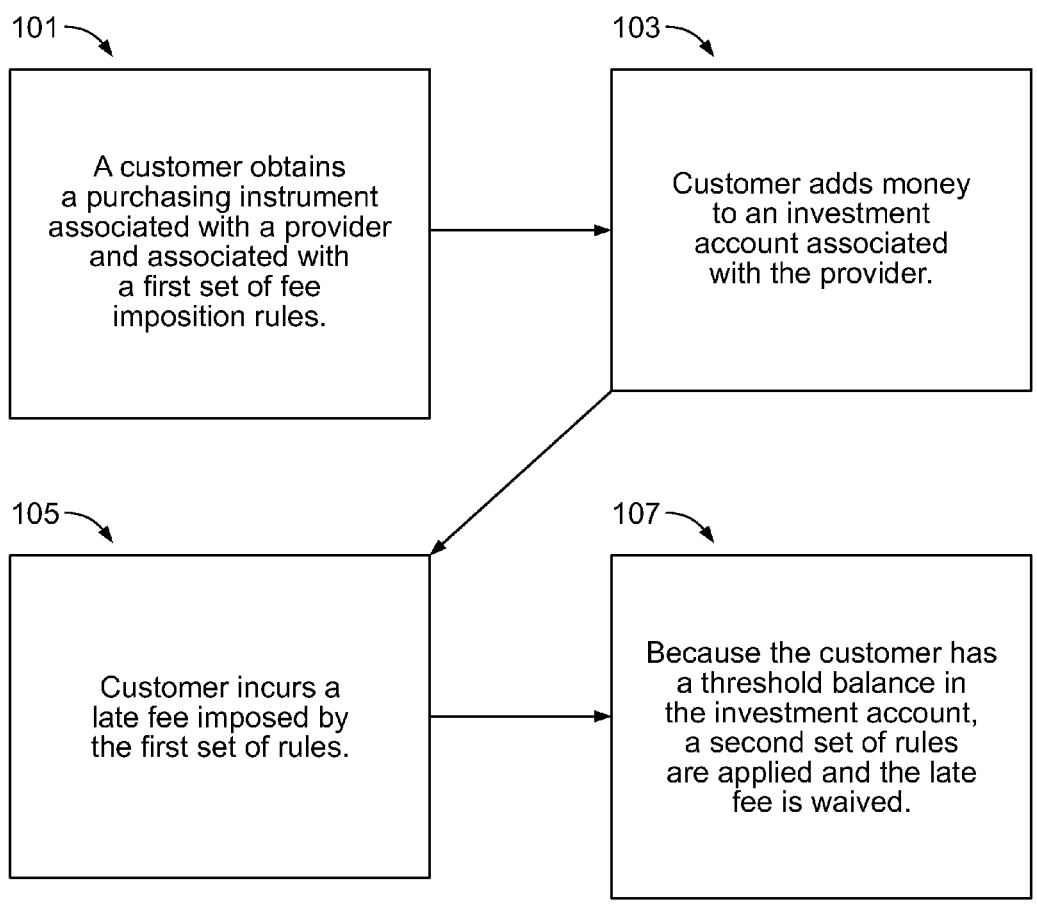
FIG. 1 shows a flow chart of an illustrative process in accordance with principles of the invention.

Systems and methods for providing relationship-based pricing are provided. Embodiments may increase customer satisfaction with services or products offered by a provider. Embodiments may increase customer utilization of services or products offered by a provider.

Relationship-based pricing may allow a provider to leverage multiple relationships a customer maintains with the provider. The provider may leverage the multiple relationships to adjust fees charged to the customer for services or products of the provider.

Fee adjustments may demonstrate to the customer that the provider is cognizant of an overall relationship between the customer and the provider. An overall relationship may include awareness of one or more relationships a customer has established with different sub-units of a provider.

A system for offering relationship-based pricing to a customer of a provider may include a first set of fee imposition rules linked to a purchasing instrument and a second set of fee imposition rules linked to a reference financial profile.

The purchasing instrument may be a credit card, a debit card, a check and bank card, a stored-value card, a bar-coded article, an instrument or device that includes a contactless chip, such as an ISO14443-compliant contactless chip, a cell phone, a personal data assistant or any other suitable electronic, encoded or information-bearing purchasing device.

Purchasing instruments may store data in a magnetic strip, a bar code, a silicon chip or any other suitable data storage device or format. A merchant may provide a point of sale terminal that is configured to receive data from, provide data to, or exchange data with, the purchasing instrument.

The system may include a processor device configured to determine the customer's eligibility for application of the second set of fee imposition rules. The customer's eligibility may be determined based on the customer's financial profile. If the customer's financial profile corresponds to the reference financial profile, the customer may be eligible for the second set of rules. If eligible for the second set of rules, the processor device may adjust a fee imposed by the first set of rules by applying the second set of rules.

The processor device may be configured to adjust a fee corresponding to an annual fee associated with the purchasing instrument.

For example, a customer may use a purchasing instrument issued by a provider that is associated with an annual fee. If the customer, because of an additional relationship with the provider, has a financial profile that corresponds to the reference financial profile, the annual fee associated with the purchasing instrument may be adjusted. The adjustment may include waiving or reducing the annual fee.

The processor device may be configured to adjust a fee corresponding to a monthly fee associated with the purchasing instrument.

The processor device may be configured to adjust a fee corresponding to a late fee associated with the purchasing instrument.

A customer may be charged a late fee if charges accrued by using a purchasing instrument are not paid within a specified time period. A late fee may be adjusted for a pre-determined customer. The pre-determined customer may be a customer with a financial profile that corresponds to the reference financial profile.

The processor device may be configured to adjust a fee corresponding to a foreign transaction fee associated with the purchasing instrument.

A foreign transaction fee may be charged for using a purchasing instrument in a foreign country. A foreign transaction fee may be charged for using a purchasing instrument in transaction involving foreign currency.

The processor device may be configured to adjust a fee corresponding to an interest charge associated with the purchasing instrument.

The processor device may be configured to adjust a fee corresponding to an interest rate associated with the purchasing instrument.

The reference financial profile may include a value of money of the customer held by the provider. The value of money may be held in an investment, savings or checking account. For example, if a customer maintains a threshold amount of money in an investment account associated with the provider, a foreign transaction fee associated with a purchasing instrument used by the customer may be waived or reduced.

The adjustment of the foreign transaction fee may demonstrate that the provider acknowledges a trust the customer has placed in the provider by maintaining the threshold amount of money in the investment account. The acknowledgement by the provider may encourage the customer to deepen current relationships or establish additional relationships with the provider.

The reference financial profile may include an amount transacted using the purchasing instrument. For example, if a customer transacts $5K using a purchasing instrument within a six-month period, a late payment fee incurred by the customer may be waived or reduced. The adjustment of the late payment fee may signify to the customer that the provider appreciates the customer's patronage. The appreciation may encourage the customer to continue to patronize the provider.

The reference financial profile may include historical data regarding a mortgage held by the customer. For example, if a customer is delinquent on mortgage payments, the customer may not be eligible for a fee waiver or reduction. The delinquency may indicate that the customer does not plan to deepen a relationship with the provider.

As a further example, a customer may be delinquent on mortgage payments, and have a record of transacting a threshold amount using a purchasing instrument. Because of the mortgage delinquency, the customer's financial profile may not correspond to the reference financial profile. Therefore, the system may deny application of the second set of rules to the customer despite the record of transacting a threshold amount using the purchasing instrument.

The reference financial profile may include a transaction history of the customer's use of the purchasing instrument. The transaction history may indicate a number of late or on-time payments associated with the purchasing instrument. The transaction history may include finance charges incurred by the customer in using the purchasing instrument.

For example, a customer that has paid charges accrued by using a payment instrument in a timely manner for twelve-consecutive months may have a financial profile that corresponds to the reference financial profile. If following the twelve-consecutive months the customer incurs a late fee, the system may waive or reduce the late fee.

Adjustment of the late fee may demonstrate to the customer that the provider understands that the customer has generally made timely payments and one-time tardiness may be excused. Such an understanding may encourage the customer to expand a relationship with the provider.

As a further example, if a customer incurs two or more late fees, despite twelve-consecutive months of timely payments, the customer's financial profile may not correspond to the reference financial profile.

As a further example, if a customer holds $100K in investments administered by the provider, the system may apply the second set of rules to the customer.

The reference financial profile may include a value of money held in a checking account. For example, if a customer retains a threshold balance of funds in a checking account, the system may apply the second set of rules to the customer.

A system for providing relationship-based pricing to a customer of a provider may include a product or service associated with a first set of fee imposition rules. The first set of fee imposition rules may be levied to use the product or service. The system may include a customer-provider relationship associated with a second set of fee imposition rules. The second set of rules may adjust the one or more fees imposed by the first set of rules.

The system may include a processor device configured to identify a customer having the product or service and the customer-provider relationship. The processor device may further be configured to apply the second set of fee imposition rules to a customer having the product or service and the customer-provider relationship.

The customer-provider relationship may include usage of a specially-branded purchasing instrument. Specially branded purchasing instruments may be associated with a waiver of fees imposed by the first set of rules.

The customer-provider relationship may include a value of money of the customer held by the provider. For example, the money may be held in a checking account or a savings account at a bank.

The customer-provider relationship may include historical data of the customer's interactions regarding two or more products or services utilized by the customer.

An adjustment of fees may convey to the customer that the customer-provider relationship established by the customer is important to the provider. Conveying the importance of the customer-provider relationship may encourage the customer to utilize additional services or products of the provider.

Additionally, a customer having the customer-provider relationship may indicate that the customer may be encouraged by an adjustment of fees. Further, such encouragement may prompt the customer to utilize additional services or products of the provider.

The processor device may be configured to identify a customer having the customer-provider relationship associated with the second set of fee imposition rules based on assigning different weights to historical data regarding each of two or more services utilized by the customer.

For example, a customer may be associated with historical data including a history of late mortgage payments and historical data including a value of money held in an investment account. The system may assign a lower weight to the historical data of late mortgage payments than to the historical data of the value of money held in the investment account. Because of the higher weight assigned to the historical data of the value of money held in the investment account, the customer may be identified as having the requisite customer-provider relationship.

As a further example, the system may assign a lower weight to the historical data of the value of money held in the investment account than to historical data including a history of delinquent mortgage payments. Therefore, because of a higher weight assigned to historical data indicating that the customer is delinquent on mortgage payments, the customer may not be identified as having the requisite customer-provider relationship.

If a customer is not identified as having the requisite customer-provider relationship, the system may not apply the second set of rules. Therefore, fees charged to the customer may not be waived or reduced.

Adjustment of a fee may include offering a customer an alternative arrangement to pay the fee. For example, customer that has earned reward points by using a purchasing instrument may be eligible to use the points to pay a fee.

Methods for providing relationship-based pricing to a customer are provided. A method may include compiling data relating to interaction between the customer and the provider.

The method may include assessing a fee associated with a purchasing instrument of the customer. The method may include adjusting the fee based on the interaction between the customer and the provider.

Adjustment of a fee may be made on a discretionary basis by the provider. For example, the provider may not pre-disclose to a customer that based on interaction with the provider, a fee may be adjusted.

Adjustment of a fee may be made in a pre-disclosed offer to the customer. For example, a provider may offer to adjust a fee based on achievement of a pre-disclosed condition. A pre-disclosed condition may include maintaining a threshold balance in a checking or investment account.

Adjustment of a fee may include increasing the assessed fee.

Adjustment of a fee may include decreasing the assessed fee.

Adjustment of a fee may include refunding a previously paid or charged fee.

Interaction between the customer and the provider may include an amount charged, over a period of time, using a purchasing instrument.

Interaction between the customer and the provider may include a delinquency on payments owed to the provider.

A customer may be informed and/or reminded why a fee is being adjusted. Informing and/or reminding a customer of the reason for an adjustment may encourage future interaction between the customer and the provider desired by the provider.

Interaction between the customer and the provider may include a customer-provider relationship. For example, if a customer has incurred or paid a fee, future interactions between the customer and the provider may establish a customer-provider relationship that qualifies the customer for a rebate of the incurred fees.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Processes in accordance with the principles of the invention may include one or more features of the process illustrated in FIG. 1.

FIG. 1 shows an illustrative process in accordance with principles of the invention. At step 101, a customer obtains a purchasing instrument associated with a first set of fee imposition rules. The customer may obtain the purchasing instrument through an application process (not shown) of a provider. The first set of fee imposition rules may require payment of a late fee. The late fee may be imposed if the customer fails to pay charges accrued using the purchasing instrument.

At step 103, the customer adds money to an investment account associated with the provider. At step 105, the customer incurs a late fee imposed by the first set of rules. If the amount of money added to the investment account exceeds a threshold amount, the customer qualifies for application of a second set of fee imposition rules.

The second set of fee imposition rules does not require payment of a late fee as long as the threshold amount is maintained in the investment account. At step 107, because the customer maintains a threshold balance in the investment account, the provider applies a second set of fee imposition rules and waives the late fee.

Figure 2:
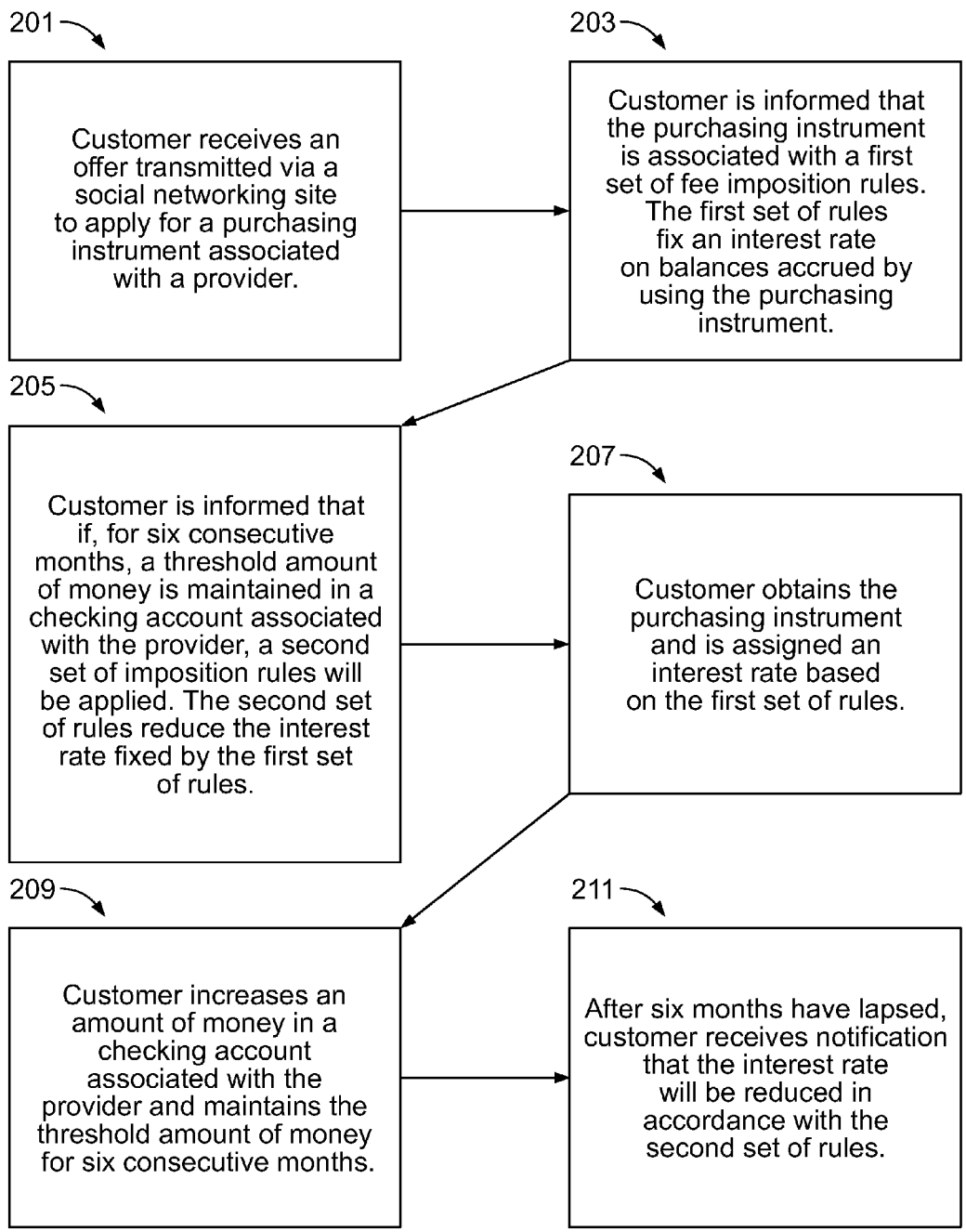
FIG. 2 shows another flow chart of an illustrative process in accordance with principles of the invention.

FIG. 2 shows another illustrative process in accordance with principles of the invention. At step 201, a customer receives an invitation, transmitted via a social networking website, to apply for a purchasing instrument associated with a provider. At step 203, the customer is informed that the purchasing instrument is also associated with a first set of fee imposition rules. The first set of rules fixes an interest rate on balances accrued by using the purchasing instrument.

At step 205, the customer is informed that if, for six consecutive months, a threshold amount of money is maintained in a checking account associated with the provider, a second set of fee imposition rules will be applied. The second set of rules reduces the interest rate fixed by the first set of rules.

At step 207, the customer obtains the purchasing instrument and is assigned an interest rate based on the first set of rules.

At step 209, the customer increases an amount of money in a checking account associated with the provider and maintains the balance for six consecutive months.

At step 211, the customer receives notification that because the threshold balance has been maintained for six consecutive months, the interest rate will be reduced in accordance with the second set of rules.

Figure 3:
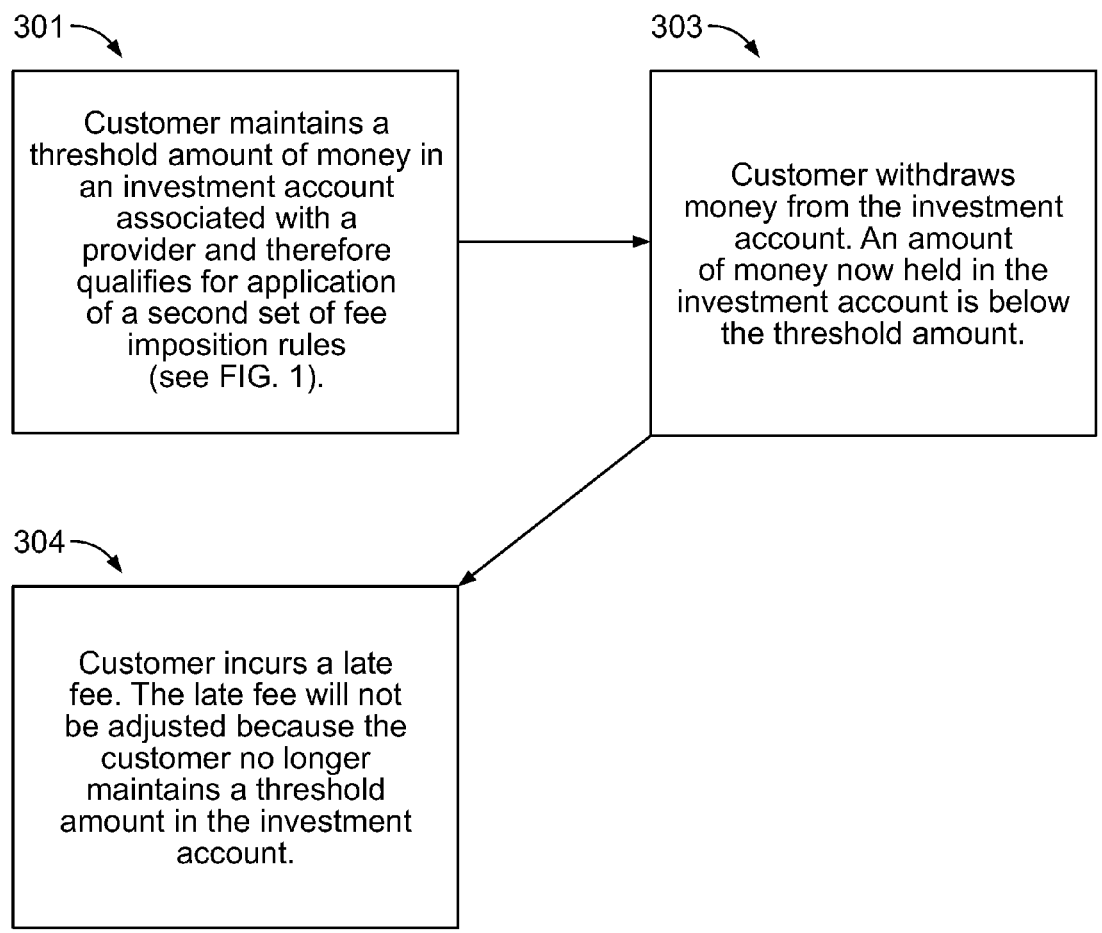
FIG. 3 shows another flow chart of an illustrative process in accordance with principles of the invention.

FIG. 3 shows another illustrative process in accordance with principles of the invention. At step 301, a customer maintains a threshold amount in an investment account associated with a provider and therefore qualifies for application of a second set of fee imposition rules (see FIG. 1). At step 303, the customer withdraws money from the investment account. An amount of money now held in the investment account drops below the threshold amount.

At step 304, the customer incurs a late fee. The late fee will not be adjusted. Because customer no longer maintains a threshold amount in the investment account, the customer does not qualify for application of a second set of rules that waives the late fee imposed by the first set of rules.

Figure 4:
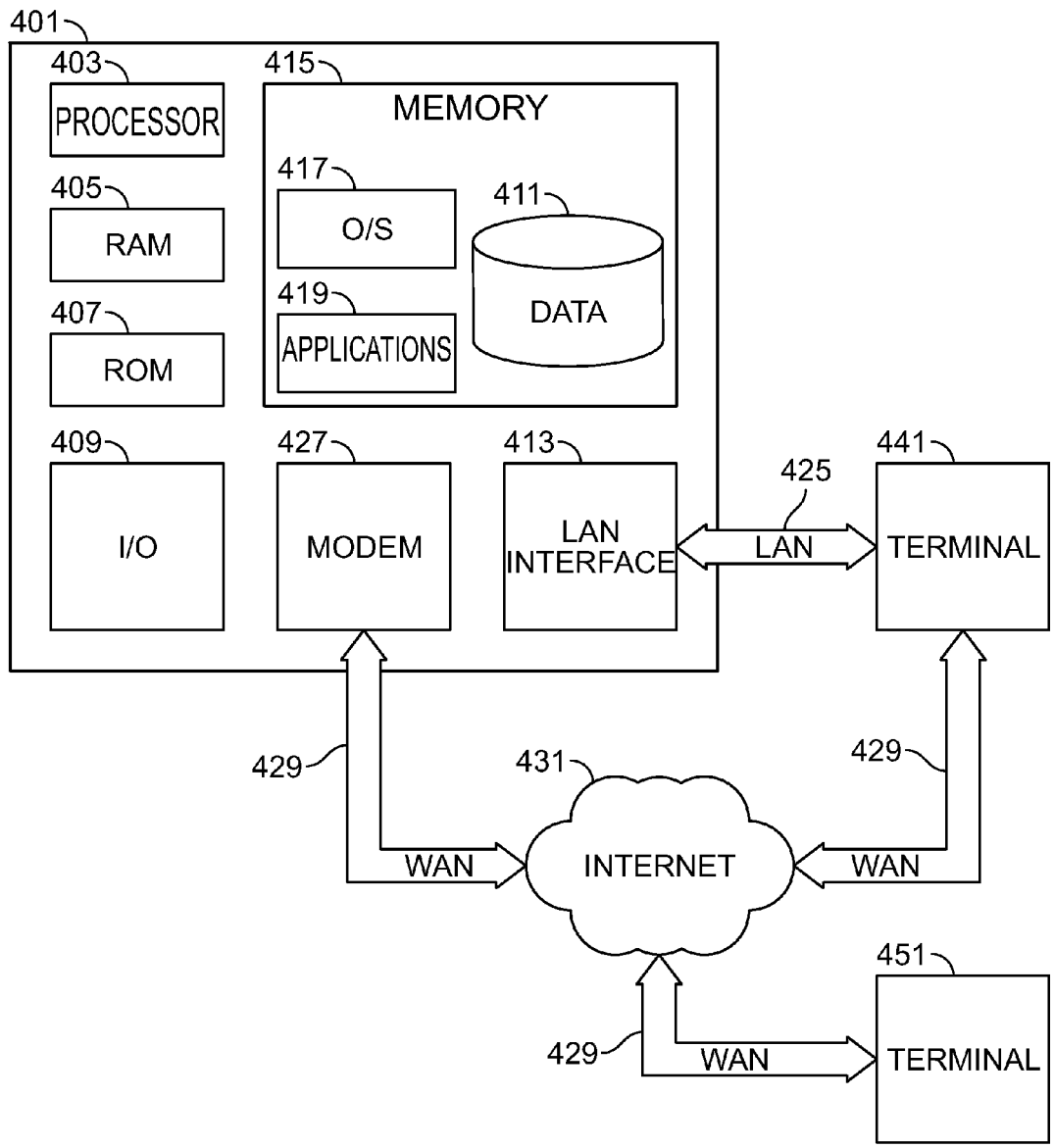
FIG. 4 shows a schematic diagram of a general purpose digital computing environment in which one or more aspects of the present invention may be implemented.

FIG. 4 illustrates a block diagram of a generic computing device 401 (alternatively referred to herein as a "server") that may be used according to an illustrative embodiment of the invention. The computer server 401 may have a processor 403 for controlling overall operation of the server and its associated components, including RAM 405, ROM 407, input/output module 409, and memory 415.

I/O module 409 may include a microphone, keypad, touch screen, and/or stylus through which a user of device 401 may provide input, and may also include one or more of a speaker for providing audio output and a video display device for providing textual, audiovisual and/or graphical output. Software may be stored within memory 415 and/or storage to provide instructions to processor 403 for enabling server 401 to perform various functions. For example, memory 415 may store software used by server 401, such as an operating system 417, application programs 419, and an associated database 411. Alternatively, some or all of server 401 computer executable instructions may be embodied in hardware or firmware (not shown). Database 411 may provide centralized storage of fee imposition rules, financial profiles, customer-provider relationships and customer-provider interaction data.

Server 401 may operate in a networked environment supporting connections to one or more remote computers, such as terminals 441 and 451. Terminals 441 and 451 may be personal computers or servers that include many or all of the elements described above relative to server 401. The network connections depicted in FIG. 4 include a local area network (LAN) 425 and a wide area network (WAN) 429, but may also include other networks. When used in a LAN networking environment, computer 401 is connected to LAN 425 through a network interface or adapter 413. When used in a WAN networking environment, server 401 may include a modem 427 or other means for establishing communications over WAN 429, such as Internet 431. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 419 used by server 401 according to an illustrative embodiment of the invention may include computer executable instructions for invoking user functionality related to communication, such as email, short message service ("SMS"), and voice input and speech recognition applications.

Computing device 401 and/or terminals 441 or 451 may also be mobile terminals including various other components, such as a battery, speaker, and antennas (not shown).

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Thus, systems and methods for relationship-based pricing have been provided. Persons skilled in the art will appreciate that the present invention can be practiced by other than the described embodiments, which are presented for purposes of illustration rather than of limitation. The present invention is limited only by the claims that follow.

What is claimed is:

1. A system for providing relationship pricing to a customer of a provider of financial services and financial products, the system comprising:
   a first set of fee imposition rules linked to a purchasing instrument provided by the provider of financial services and financial products;
   a second set of fee imposition rules linked to a reference financial profile; and
   a processor device configured to:
      determine whether a customer financial profile corresponds to the reference financial profile; and,
      if the customer financial profile corresponds to the reference financial profile, adjust a late fee imposed by the first set of rules by applying the second set of rules;
   wherein:
   said reference financial profile includes historical data of the customer's interactions with the provider regarding two or more financial products or financial services provided by the provider to the customer, at least two of the two or more products or services not being the purchasing instrument; and
   the processor device is configured to determine whether the customer has the reference financial profile based on assigning different weights to the historical data regarding each of the two or more financial products or financial services.

2. The system of claim 1 wherein the processor device is configured to adjust a fee corresponding to an annual fee associated with the purchasing instrument.

3. The system of claim 1 wherein the processor device is configured to adjust a fee corresponding to a monthly fee associated with the purchasing instrument.

4. The system of claim 1 wherein the processor device is configured to adjust a fee corresponding to a foreign transaction fee associated with the purchasing instrument.

5. The system of claim 1 wherein the processor device is configured to adjust a fee corresponding to an interest charge associated with the purchasing instrument.

6. The system of claim 1 wherein the processor device is configured to adjust a fee corresponding to an interest rate associated with the purchasing instrument.

7. The system of claim 1 wherein the reference financial profile includes an amount held in an account at the provider.

8. The system of claim 1 wherein the reference financial profile includes an amount transacted using the purchasing instrument.

9. The system of claim 1 wherein the reference financial profile includes historical data regarding a mortgage of the customer.

10. The system of claim 1 wherein the reference financial profile includes a transaction history of the customer's use of the purchasing instrument.

11. The system of claim 1 wherein the reference financial profile includes a value of money of the customer held by the provider.

12. The system of claim 11 wherein the value of money is held in a checking account.

13. The system of claim 11 wherein the value of money is held in an investment account.

14. The system of claim 1, wherein, to adjust the fee imposed by the first set of rules comprises providing alternative methods to pay the fee.

15. A system for providing relationship pricing to a customer of a provider of financial services and financial products, the system comprising:
   a first financial service or a first financial product provided by the provider of financial services and financial products, the first service or the first product associated with a first set of late fee imposition rules for usage of the service or the product;
   a customer-provider relationship associated with a second set of late fee imposition rules, said second set of rules for adjusting late fees imposed by the first set of rules; and
   a processor device configured to:
      identify a customer having the first financial service or the first financial product and the customer-provider relationship; and
      apply the second set of late fee imposition rules to the customer;
wherein:
   said customer-provider relationship includes historical data of the customer's interactions with the provider regarding two or more financial products or financial services provided by the provider to the customer, the two or more products or services being exclusive of the first product or the first service; and
   the processor device is configured to identify the customer based on assigning different weights to the historical data regarding each of the two or more financial products or financial services.

16. The system of claim 15 wherein the customer-provider relationship includes a specially-branded purchasing instrument.

17. The system of claim 15 wherein the customer-provider relationship includes a value of money of the customer held by the provider.

18. A method for providing relationship-based pricing to a customer of a provider of financial services and financial products, the method comprising:
   using a logical processing unit to:
      compile data relating to interactions between the customer and the provider of financial services and financial products;
      assess a late fee associated with a purchasing instrument provided by the provider to the customer; and
      adjust the late fee associated with the purchasing instrument based on the data relating to interaction between the customer and the provider;
wherein:
   said data includes historical data of the customer's interactions with the provider regarding two or more financial products or financial services provided by the provider to the customer, at least two of the to or more products or services not being the purchasing instrument; and
   the processor device is configured to adjust the late fee based on assigning different weights to the historical data regarding each of the two or more financial products or financial services.

19. The method of claim 18 wherein the adjusting of the fee is made at a discretion of the provider.

20. The method of claim 18 wherein the adjusting of the fee corresponds to a pre-disclosed offer to the customer.

21. The method of claim 18 wherein the adjusting the fee includes increasing the fee.

22. The method of claim 18 wherein the adjusting the fee includes decreasing the fee.

23. The method of claim 18 wherein interaction between the customer and the provider includes an amount charged, over a period of time, using the purchasing instrument.

24. The method of claim 18 wherein interaction between the customer and the provider includes delinquency on payments owed to the provider.

25. The method of claim 18 wherein the adjusting the fee includes providing an alternative method of paying the fee.

* * * * *